Patented Apr. 26, 1949

2,468,658

UNITED STATES PATENT OFFICE 2,468,658

TREATMENT OF DRILLING FLUIDS

Milton Dyke, San Marino, and Edward Samuel Self, Bakersfield, Calif.

No Drawing. Application July 21, 1947, Serial No. 762,530

10 Claims. (Cl. 252—8.5)

This invention relates to the treatment of drilling fluids and particularly to the treatment of water base drilling fluids, such as are employed in the rotary drilling of oil wells.

This application is a continuation in part of our co-pending application Serial No. 665,898 for treatment of drilling fluids, filed April 29, 1946.

In drilling wells by the rotary method, it is necessary to circulate a drilling fluid in the bore hole to lubricate the drill bit, to carry the cuttings up to the surface, to hold down the formation pressures, and to form on the walls of the bore hole a sheath or cake which prevents the drilling fluid from escaping into the formation.

Drilling fluids of the water base type consist of a clay suspended in water to which weighting materials, such as bentonite, galena, iron oxide, etc., are sometimes added to increase the specific gravity of the mud. The mud may be made from the natural clay which occurs at the location of the well or may be synthetically compounded from the clay and mud bases of commerce, including bentonite and beidellite.

In order to perform its function as has been above noted, the composition and condition of the drilling fluid must be rather closely controlled, and that is particularly true of its water loss to the formation and its viscosity; for if the water loss be too high, the filter cake on the wall builds up to such an extent that circulation of the mud fluid between the drill pipe and the walls of the hole is greatly impeded. Still further reasons for keeping the filter loss at the lowest possible level are to prevent caving of the walls of the bore hole and, to obtain the best possible result when cementing the casing, a thin mud cake is desirable. Still another reason for keeping water loss at a minimum is that when contacting the oil or gas sands, the escape of water from the drilling fluid into the oil or gas sand blocks the flow of oil or gas into the bore hole and thereby lessens production from the producing sands.

Referring to the importance of the control of viscosity of a drilling fluid as aforementioned, if the viscosity is too low, the cuttings will not be carried to the surface properly and freezing of the drill stem may take place; if the viscosity is too high, then the cuttings will not be properly deposited in the settling ditch or slush pit of the well, and moreover the drilling fluid column is likely to be "gas-cut"; that is, become permeated with gas from the formation being drilled. For practical purposes, the viscosity is usually maintained at between about 15 and 100 centipoises, depending on drilling conditions as measured on a Stormer viscosimeter.

A drilling fluid of low water loss and of proper viscosity may change appreciably as to both of these important characteristics during use. The drilling of the formation causes cuttings to enter the fluid and these cuttings may include salts or materials which increase the water loss of the drilling fluid and also increase its viscosity. The salts that seem to be particularly offensive in such regard as those of calcium and magnesium.

A still further source of contamination to the drilling fluid is that brought on by cementing a formation and a subsequent drilling operation through the cement.

One of the objects of this invention therefore is to provide a drilling fluid and a treatment for a drilling fluid for effectively lowering the water loss of said fluid.

Another object is to provide a process for treating drilling fluids in order to reduce the water loss of said fluids.

A still further object is to provide a treatment for a drilling fluid having the combined effect of reducing the water loss of said drilling fluid and the viscosity thereof.

A still further object of this invention is to provide an improved process for the treatment of drilling fluids with the chemical agents hereinafter set forth.

Still another object is to provide drilling fluid which has improved qualities and characteristics adapting it particularly to the function of lubricating the drilling bit.

Further objects will appear from the description to follow, and it is understood that modifications thereof are included within the scope of the invention as set out in the appended claims.

One or more of the aforesaid objects may be accomplished by incorporating a small amount of water soluble tall oil type soap into a water base drilling fluid.

The term water soluble tall oil type soap is used particularly herein to describe "floating soap." In the production of paper or other cellulosic products by extracting coniferous or pine trees with a caustic soda sulphite or sulphate liquor (kraft process) a saponaceous product is produced. Upon concentration of the so called black liquor the saponaceous product "floating soap" separates to the surface of the black liquor.

The "floating soap" may be freed of entrained black liquor by salting out said liquor with sodium chloride and the like and/or centrifuging. The "floating soap" as described above is used to produce the tall oil of commerce. It will be understood that by water soluble tall oil type soap we also include the use of water soluble soaps prepared from tall oil or rosin acids produced from the pine trees and/or mixtures thereof by treatment with alkali metal hydroxides.

The instant invention particularly contemplates the use of a granulated water soluble tall oil type soap. Such a material can be prepared preferably by vacuum drying of "floating soap" or spray drying of said soap. Included of course are granulated soaps produced by the dehydration of soaps formed from alkali metal hydroxides and tall oil and/or the rosin acids produced from pine trees and mixtures thereof. By granulated soap we mean dehydrated soaps that may or may not be powdered. Such soaps may contain from about 5% to 35% water and preferably from 8% to 12% water.

To particularly illustrate the preferred embodiment of our invention a 5 lb. sample of "floating soap" obtained from a paper company in East Texas was converted to a dry granulated soap for use as a water base drilling fluid additive by drying said "floating soap" after removal of entrained black liquor under a 28 inch vacuum at a temperature of 50° C. for several hours. The additive so produced contained 18% water. It was added to several samples of suspensions of Rogers Lake clay in water. The suspensions were prepared by adding 1.68 parts of Rogers Lake clay to 2.00 parts of Los Angeles tap water. Samples of 475 cc. of the suspension together with 25 cc. of crude oil as an anti-foaming agent were tested in the standard A. P. I. filter press tester with varying amounts of the additive. The results in terms of the standard A. P. I. filter tests were as follows:

| Minutes of Test | #1 No additive pH 9.5 | #2 10 g. additive 9.75 | #3 12 g. additive 9.78 | #4 15 g. additive 9.80 | #5 20 g. additive 9.85 |
| --- | --- | --- | --- | --- | --- |
| 0 | | | | | |
| 5 | 2.4 cc | 1.3 | 0.2 | 0.0 | 0.0 |
| 10 | 3.7 | 1.7 | 0.9 | 0.5 | 0.0 |
| 15 | 4.7 | 2.2 | 1.3 | 1.0 | 0.8 |
| 30 | 7.0 | 3.3 | 2.1 | 1.8 | 1.7 |

The drilling fluids prepared and tested with our additive as noted in the table above had excellent thixotropic properties and produced an exceptionally soft filter cake. The value of such a soft filter cake will be appreciated by production engineers who prefer a complete removal of the mud cake from the walls of the bore hole when the well is put on production.

In addition to the advantages noted above for drilling fluid treated in accordance with our invention said drilling fluids have excellent lubricating properties. Such properties in a drilling fluid account for small variations in diameter as shown by caliper logs, lessen power requirements on the drilling rig and minimize "balling up" of the drilling bit.

In accordance with our invention clay water suspensions may be treated with a combination of tannins such as chestnut bar or quebracho and water soluble tall oil type soaps in order to give lower yield values and maintain low water losses. For example a 475 cc. suspension of Rogers Lake clay and 25 cc. of crude oil prepared as has been described in the foregoing, was treated with 5 gr. of chestnut bar and 15 gr. of granulated floating soap. The yield value of the suspension was appreciably reduced and yet the suspension when tested in the A. P. I. filter press showed a water loss of only 0.0 cc. in 5 min., 0.30 cc. in 10 min., 0.90 cc. in 15 min., and 1.65 cc. in 30 min.

In a combination treatment with tannins and water soluble tall oil type soaps the tannins should be present in an amount equal to about 5 to 40% by weight of said water soluble tall oil type soap depending on the yield values desired in the clay water suspension. A preferred quantity for our treatment is from 10 to 20%.

The anti-foaming agents that have been referred to herein comprise any hydrocarbon base material such as alcohols, benzene, pine oil, petroleum oils such as crude oil, fuel oil, kerosine and the like. It has been found that such materials reduce any foaming that may occur due to the vigorous agitation of the drilling mud. In addition critically small quantities of said anti-foaming agents in combination with our water soluble tall oil type soaps increase the effectiveness of our drilling fluid treatment with larger quantities of the anti-foaming agents serving only as a diluent. Such critical quantities of anti-foaming agent have been found to be of the order of 2 to 5% of the volume of the drilling fluid being treated.

In accordance with our treatment of drilling fluids the water soluble tall oil type soaps should be used in small amounts such as 1 to 6% by weight (dry basis) and preferably 2 to 4% by weight of the drilling fluid treated. The exact amount to be used substantially within these limits will vary with the water loss tolerance desired as will be appreciated by drilling mud engineers. The drilling fluid treated should preferably contain about 5% by volume of an anti-foaming agent.

In order to facilitate grinding, packaging and warehousing of the granulated treating agents of the instant invention it will be found advantageous to incorporate from about 5% to 20% by weight of clay preferably of the so called Wyoming swelling type bentonite clay. By way of example, a suitable treating agent may contain about 9% by weight of swelling type bentonite, about 11% by weight of chestnut bark and about 80% by weight of granulated floating soap.

Our copending application, Serial No. 65,513, filed December 15, 1948, claims subject matter disclosed but not claimed here.

From the forgoing it will be appreciated that we have provided a new and novel treatment for increasing the efficiency of water base drilling fluids and lowering the water loss thereof. While our invention has been described, it is intended that the description shall be taken as illustrative and that changes may be made in the products and processes within the scope of the appended claims.

We claim as our invention:

1. A water clay base drilling fluid of suitable viscosity for use in oil and gas well drilling, said fluid consisting essentially of water, clay and "floating soap" in an amount, on a dry basis, of from 1% to 6% of the weight of the drilling fluid treated.

2. A water clay base drilling fluid of suitable viscosity for use in oil and gas well drilling, said fluid consisting essentially of water, clay and "floating soap" in an amount, on a dry basis, of from 1% to 6% of the weight of the drilling fluid treated and about 5% by volume of a petroleum oil.

3. A water clay base drilling fluid of suitable viscosity for use in oil and gas well drilling, said fluid consisting essentially of water, clay and "floating soap" in an amount on a dry basis of from 1% to 6% of the weight of the drilling fluid treated and a sufficient quantity of a petroleum oil to inhibit foaming of the resulting drilling fluid.

4. A water clay base drilling fluid of suitable viscosity for use in oil and gas well drilling, said fluid consisting essentially of water, clay and "floating soap" in an amount on a dry basis of from 2% to 4% of the weight of the drilling fluid treated and a sufficient quantity of a petroleum oil to inhibit foaming of the resulting drilling fluid.

5. A water base drilling fluid treating composition consisting of as its principal constituents about 80% by weight of granulated "floating soap," about 11% by weight of chestnut bark and about 9% by weight of swelling type bentonite.

6. The process of circulating a drilling fluid in a well being drilled for the production of oil or gas to form a substantially water impervious sheath on the walls of the bore hole of said well and to lubricate the bit used in the drilling of said well, which comprises: preparing a water clay drilling fluid of suitable viscosity for use in oil and gas well drilling, and mixing said fluid with "floating soap" in an amount, on a dry basis, of about 1% to 6% of the weight of said drilling fluid and circulating the fluid so produced in a well bore hole whereby a substantially impervious sheath is formed on the walls of said bore hole.

7. The process of circulating a drilling fluid in a well being drilled for the production of oil or gas to form a substantially water impervious sheath on the walls of the bore hole of said well and to lubricate the bit used in the drilling of said well, which comprises: preparing a water clay drilling fluid of suitable viscosity for use in oil and gas well drilling, and mixing said fluid with "floating soap" in an amount, on a dry basis, of from 1% to 6% of the weight of said drilling fluid and a petroleum oil in an amount sufficient to inhibit substantial foaming of said water, clay, "floating soap" drilling fluid when employed as a circulating medium in an oil or gas well, and circulating the drilling fluid so produced in a well bore hole whereby a substantially impervious sheath is formed on the walls of said bore hole.

8. The process of circulating a drilling fluid in a well being drilled for the production of oil or gas to form a substantially water impervious sheath on the walls of the bore hole of said well and to lubricate the bit used in the drilling of said well, which comprises: preparing a water clay drilling fluid of suitable viscosity for use in oil and gas well drilling, and mixing said fluid with "floating soap" in an amount, on a dry basis, of from 2% to 4% of the weight of the drilling fluid treated and a petroleum oil in an amount sufficient to inhibit substantial foaming of said water, clay, "floating soap" drilling fluid when employed as a circulating medium in an oil or gas well, and circulating the drilling fluid so produced in a well bore hole whereby a substantially impervious sheath is formed on the walls of said bore hole.

9. The process of circulating a drilling fluid in a well being drilled for the production of oil or gas to form a substantially water impervious sheath on the walls of the bore hole of said well and to lubricate the bit used in the drilling of said well, which comprises: preparing a water clay drilling fluid of suitable viscosity for use in oil and gas well drilling, and mixing said fluid with "floating soap" in an amount on a dry basis, of about 1% to 6% of the weight of the drilling fluid treated and about 5% by volume of a petroleum oil, and circulating the drilling fluid so produced in a well bore hole whereby a substantially impervious sheath is formed on the walls of said bore hole.

10. The process of circulating a drilling fluid in a well being drilled for the production of oil or gas to form a substantially water impervious sheath on the walls of the bore hole of said well and to lubricate the bit used in the drilling of said well, which comprises: preparing a water clay drilling fluid of suitable viscosity for use in oil and gas well drilling, and mixing said fluid with granulated "floating soap" in an amount, on a dry basis, of from 1% to 6% of the weight of said drilling fluid and a petroleum oil in an amount sufficient to inhibit substantial foaming of said water, clay, "floating soap" drilling fluid when employed as a circulating medium in an oil or gas well, and circulating the drilling fluid so produced in a well bore hole whereby a substantially impervious sheath is formed on the walls of said bore hole.

MILTON DYKE.
EDWARD SAMUEL SELF.

REFERENCES CITED

The following references are of record in the file of this patent:

UNITED STATES PATENTS

| Number | Name | Date |
|---|---|---|
| 1,819,646 | Loomis et al. | Aug. 18, 1931 |
| 1,999,766 | Lawton et al. | Apr. 30, 1935 |
| 2,109,858 | Cannon | Mar. 1, 1938 |
| 2,209,591 | Barnes | July 30, 1940 |
| 2,286,835 | Robinson et al. | June 16, 1942 |
| 2,369,407 | Robinson | Feb. 13, 1945 |
| 2,380,156 | Dobson et al. | July 10, 1945 |
| 2,393,574 | Sommer | Jan. 22, 1946 |
| 2,431,891 | Rosencranse | Dec. 2, 1947 |

OTHER REFERENCES

Lawton et al., Chemical treatment of rotary drilling fluids, article in Physics, vol. 2, pages 373 and 374, May 1932.

Passler, The problem of improving drilling muds, Chemical Abstracts, vol. 38, page 473, January 20, 1944.